United States Patent
Wilson et al.

[11] Patent Number: 5,940,152
[45] Date of Patent: Aug. 17, 1999

[54] DUAL-FRESNEL FIELD LENS FOR A SINGLE-PANEL LCD PROJECTION SYSTEM

[76] Inventors: Stephen S. Wilson, 27371 Silver Creek Dr., San Juan Capistrano, Calif. 92675; Benjamin Wooley, 10 Brook Valley Dr., Rochester, N.Y. 14624; Ronald F. Rykowski, 19507-223rd Ave. NE., Woodinville, Wash. 98072

[21] Appl. No.: 08/848,826

[22] Filed: May 1, 1997

[51] Int. Cl.$^6$ .................................................. G02F 1/1335
[52] U.S. Cl. ................................................. 349/57; 345/5
[58] Field of Search .................................. 349/5, 6, 7, 8, 349/9, 10, 57

[56] References Cited

U.S. PATENT DOCUMENTS

| | | |
|---|---|---|
| 5,325,218 | 6/1994 | Willett et al. ............................. 349/74 |
| 5,355,187 | 10/1994 | Ogino et al. ................................. 349/5 |
| 5,537,171 | 7/1996 | Ogino et al. ................................. 349/5 |
| 5,676,804 | 10/1997 | Fujii et al. .......................... 204/192.28 |

FOREIGN PATENT DOCUMENTS 60-233623   11/1985   Japan ....................................... 349/57

*Primary Examiner*—William L. Sikes
*Assistant Examiner*—Tiep H. Nguyen

[57] ABSTRACT

A dual-Fresnel field lens liquid crystal display projection system which includes first and second flat Fresnel lenses having their faceted surfaces facing one another and positioned adjacent to one another along the optical axis of the system between a liquid crystal display light modulator and the entrance aperture to a projection lens assembly to form a field lens assembly for the projection system.

5 Claims, 3 Drawing Sheets

DUAL-FRESNEL FIELD LENS FOR A SINGLE-PANEL LCD PROJECTION SYSTEM

BACKGROUND OF THE INVENTION

A Fresnel lens is a flat optical device that focuses light from a series of concentric grooves which define concentric facet surfaces and which are molded or cut into the surface of the device. Each groove is trapezoidal in cross-section, with the facet angles being varied in a controlled manner at different distances from the optical axis of the lens. Specifically, the Fresnel facets are formed on one surface of the optical zone of the lens, and no large thickness is required. This is because the Fresnel facets perform the desired focusing action by acting as a series of concentric prisms, directing the incoming light rays to a common point.

A Fresnel lens is used in the liquid crystal display (LCD) projection system of the present invention. The use of a single Fresnel lens as part of the imaging optical train is common practice for single-panel LCD projection systems. The Fresnel lens is generally employed as a field lens, located between the LCD spatial light modulator, which is usually referred to as the LCD valve, and the input to the projection lens assembly.

The purpose of a field lens is to "bend" the light rays passing through the LCD valve into a convergent cone, so that all the rays are captured by the input aperture of the projection lens. By having the field lens converge the rays between the LCD valve and the projection lens, the projection lens elements in the system can be smaller in diameter. Smaller diameter projection lens elements provide two principal advantages in the optical design.

The first advantage is a reduction in aberration of the projection lens elements. The second advantage is that a smaller lens is less costly to produce than a larger lens. This is because the cost of a simple lens varies roughly as the square of its diameter, so that halving the diameter of a lens reduces its surface area by a factor of four, thus reducing the work required to grind and polish its optical surfaces by 75%.

Since the purpose of the field lens is to redirect all the rays that pass through the LCD valve, the field lens must extend fully to the corners of the LCD valve. Therefore, the field lens must have a clear aperture which is at least slightly larger than the diagonal dimension of the LCD valve, assuming that the rays of light passing through the LCD valve are roughly collimated or only slightly divergent, as is typically the case. For a LCD valve with a diagonal measurement of 6.5 inches, the field lens must have a clear aperture approaching 7 inches, which is an extremely large lens.

If the field lens described above were not a Fresnel type, but a conventional glass lens, it would have to be relatively thick, heavy and expensive, and it would introduce substantial and undesirable field curvature. A Fresnel lens, however, is typically a thin (about 2 millimeters), injection-molded acrylic element, weighing 1 or 2 ounces, and costing a relatively small amount in production quantities. The major benefit in the use of a Fresnel lens as a field lens is that the thin, light, inexpensive optical element can be used to reduce substantially the size, weight, and cost of all the lens elements that follow the Fresnel lens in the optical train. Moreover, the Fresnel lens does not have the tendency to introduce undesirable field curvature.

However, complications arise in the use of Fresnel lenses in LCD projection systems. That is, as the focal length of the Fresnel lens becomes shorter and its f/# becomes smaller, the optic-mechanical features that make the Fresnel lens so useful are the same features that create potential pitfalls, by vignetting the light at the corners.

Accordingly, an object of the present invention is to provide a LCD projection system which utilizes Fresnel lenses, and in which the difficulties associated with the use of Fresnel lenses are obviated.

BRIEF SUMMARY OF THE INVENTION

A liquid crystal display (LCD) system which incorporates two Fresnel lenses to constitute a field lens in order to overcome the vignetting of the prior art LCD systems which use a single Fresnel lens as a field lens.

DETAILED DESCRIPTION OF THE ILLUSTRATED EMBODIMENT

Figure 1:
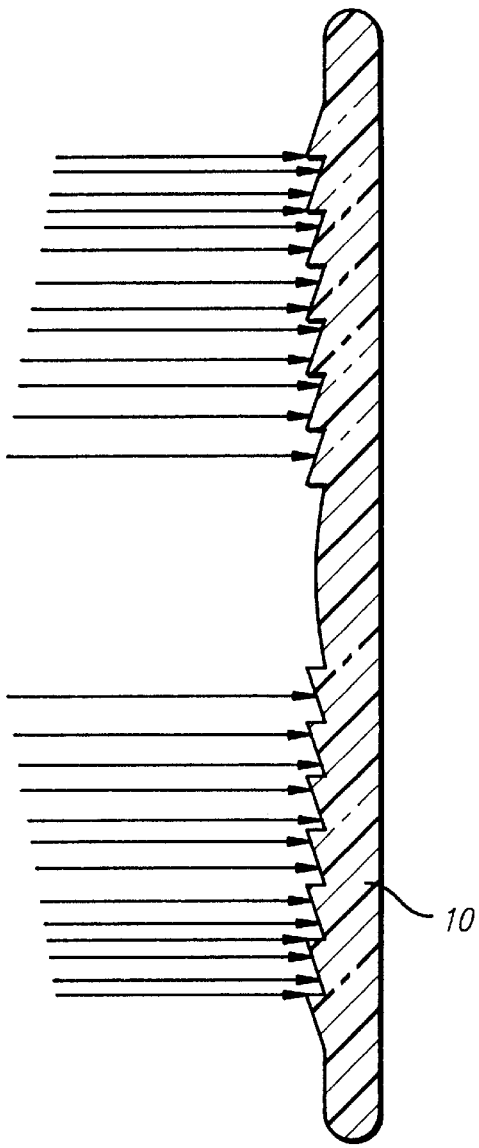
FIG. 1 shows a cross-sectional view of a Fresnel lens used as a field lens between an LCD light valve and a projection lens in an LCD projection system in conjunction with a collimated beam of light directed through the LCD light valve toward the projection lens.

FIG. 1 is a representative cross-sectional view of a Fresnel lens 10. The three surfaces of interest in the drawing are the planar surface, the facet surfaces, and the return surfaces. The planar surface has no optical power. During the injection-molding cycle, the planar surface is created by molding it against an optically-polished flat mold surface. The facet surfaces of the Fresnel lens constitute the feature that provides the optical power. The facet angles are arranged to provide the desired refractive power for each radial position from the center of the lens to the edge. The "tilt" of each facet surface may be considered as corresponding to the tangent to the surface of an equivalent conventional lens at the same radial position. The return surfaces constitute the physical feature of the lens required to maintain all of the facet surfaces in a common plane. If there were no return surfaces, the lens would not be "collapsed" back onto itself, and it would be a conventional, rather than a Fresnel, lens.

In the representation of FIG. 1, the return surfaces of the Fresnel lens 10 are all shown as being parallel to the optical axis, and the lens is shown as constituting a field lens for a perfectly collimated beam of light directed through an LCD light valve to a projection lens. As shown in FIG. 1, the return angles are all aligned exactly with the direction of ray propagation. Therefore, from the standpoint of the incident rays, the return surfaces all "disappear." It should be pointed out that there will still be some theoretical loss of efficiency in the illustrated implementation as compared with a conventional continuous-surface lens, since some of the rays refracted by the facet surfaces will subsequently strike the return surfaces.

The simplified example of FIG. 1 fails to incorporate two key elements of a real-world implementation of the Fresnel lens. The first key element is that the return angles cannot, for practical production reasons, have a draft angle of 0°. Specifically, a draft angle must be added to the slope or taper of the part face on the injection-molded components to make it possible to withdraw the completed part from the mold without mechanical interference. The second key element is that in a practical system, the incident light is never truly collimated.

The Fresnel lens is manufactured by an injection molding process in which there is a master tool which forms one face of the molding cavity. The master tool has the exact complementary surface structure of the Fresnel lens. Specifically, the surface of the master tool is a series of concentric rings of grooves comprising the "negative" of the facet and return surfaces. In order to assure the release of the Fresnel lens from the mold cavity after the molding cycle, a small draft angle is required on the return surfaces in order that these surfaces will not have a tendency mechanically to lock with the master tool. The minimum mechanical draft angle is typically of the order of 4°.

Figure 2:
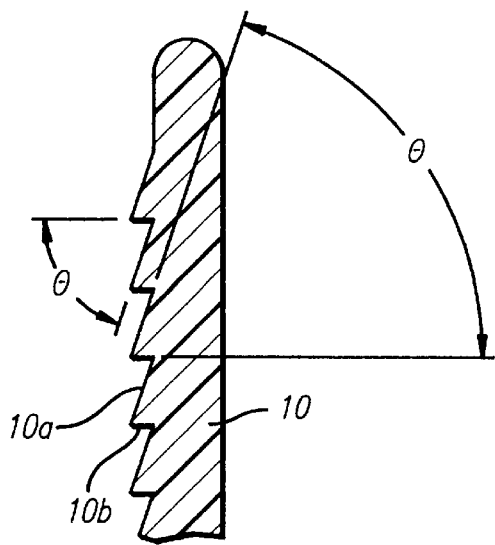
FIG. 2 is a sectional view of the outer edge of a Fresnel lens on a somewhat enlarged scale with respect to FIG. 1.

FIG. 2 is a detailed view on a somewhat enlarged scale with respect to the view of FIG. 1 of a portion of a Fresnel lens 10 adjacent its outer edge. It can be seen in FIG. 2 that the included angle φ between a facet surface 10a and its adjacent return surface 10b becomes more acute as the facet angle becomes steeper. The included angle θ, also between the facet surface and the return surface, but measured across the solid acrylic bulk of the lens, likewise becomes steeper. The significance of the θ angle is that it is the positive complement with respect to the negative space in the master tool. θ, therefore, defines the maximum possible included angle between the edges of the cutter used to cut the circular groove into the master tool. In practice, the cutter has an included angle slightly less than θ, so that each facet surface and its adjacent return surface may be cut in two independent passes.

The minimum included angle of the cutter for the master tool is therefore another practical limitation on the facet-to-return angle relationship of the Fresnel lens. If the facet angle becomes radically steep, the adjacent return angle may be forced to be greater than would be desirable from an optical standpoint, in order to accommodate the physical limitations of the master cutting tool.

In addition to the mechanical limitations on possible return angles, discussed above, there are also optical complications. As previously mentioned, perfectly collimated light as represented in FIG. 1 does not exist in any practical system, that is, a system which derives its illumination from a conventional lamp source. It may be noted that laser light can be virtually perfectly collimated, but laser light is not a practical light source for most projection systems. Even in the most closely collimated illumination from a conventional lamp, there will be rays which deviate from the nominal direction of the bundle of light in any given X-Y plane location.

Figure 3A:
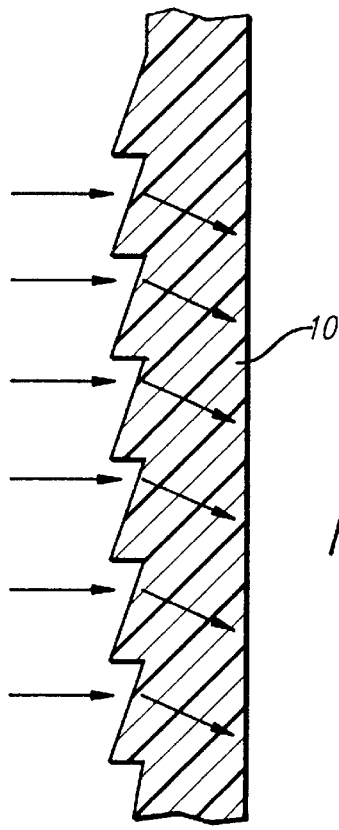
FIGS. 3A, 3B and 3C are fragmentary sectional views of a Fresnel lens included in a telecentric illumination system, FIG. 3A showing the chief rays of the telecentric system, FIG. 3B showing the divergent rays of the telecentric system, and FIG. 3C illustrating the convergent rays in the telecentric bundle.
Figure 3B:
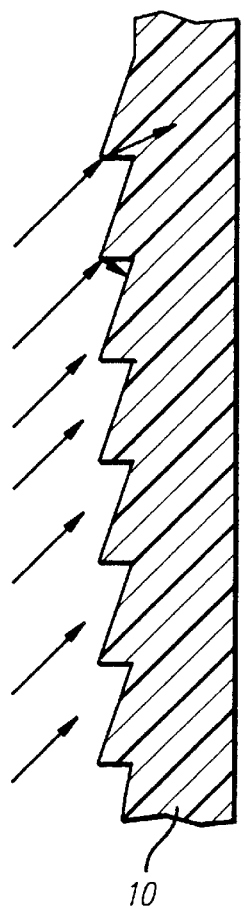
Figure 3C:
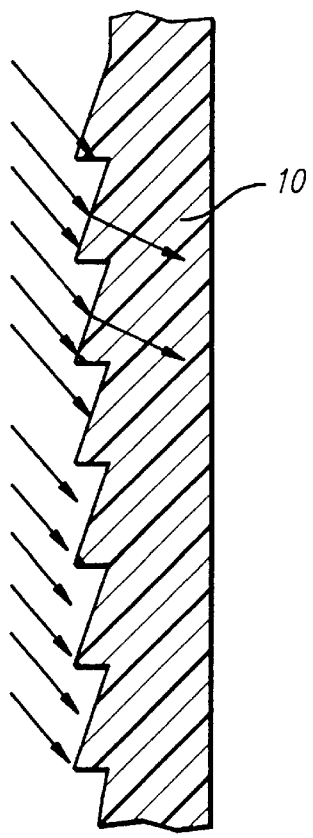

In the case of the commonly used telecentric illumination system, the chief rays of the optical bundles at every field position in the X-Y plane are basically parallel to each other and to the optical axis. Surrounding each chief ray is a cone of rays, some of which are divergent with respect to the optical axis, and some of which are convergent. FIGS. 3A, 3B and 3C illustrate some of the complexities as to how these rays are treated by the Fresnel field lens.

As shown in FIG. 3A, the chief rays of a telecentric illumination system behave the same way as the perfectly collimated light in the example of FIG. 1. That is, the chief rays of a telecentric illumination system are essentially parallel to the return surfaces of the Fresnel lens, and thus are not affected by the return surfaces. For the divergent and convergent rays of FIGS. 3B and 3C respectively, however, the effects are more complicated.

For example, as shown in FIG. 3B, some of the divergent rays will impinge on the return surfaces of the Fresnel lens 10, rather than on the facet surfaces. Depending upon the angle at which a divergent ray strikes a return surface, the ray may either be reflected if it strikes the return surface at a glancing incidence, or it may be refracted. In the case of the reflected ray, the light will subsequently enter the adjacent facet surface and be directed generally in the right direction, although slightly displaced. In the case of the ray refracted by its entry into the return surface, the ray will be bent into an even more divergent angle, likely exiting the lens in a totally useless direction.

Convergent rays in a telecentric bundle are less likely to be refracted by the return surfaces, since the return surfaces appear "undercut" to the convergent rays. FIG. 3C shows how the convergent rays may be refracted in the facet surfaces and subsequently strike a return surface, rather than traverse the bulk of the lens material. In this case, the ray will either be refracted again by the return surface, or reflected from it, depending on the angle of incidence.

As discussed above, a complex situation arises with Fresnel lenses operating under "real world" illumination conditions. For both convergent and divergent rays, the multiple refractive/reflective possibilities are compounded by high powered Fresnel lenses in which the facet surfaces are both strongly tilted out. Beyond some upper boundary, the problems created by high optical power in a Fresnel field lens lead to untenable levels of inefficiency, both across the field as a whole and differentially from the center to the edge of the lens.

LCD projection systems often require high powered Fresnel lenses due to the short LCD-to-lens pupil distance. This requirement causes the optical demands of the Fresnel field lens to extend beyond that which can be accomplished with a single lens. The short LCD-to-pupil distance requires such a strong Fresnel lens that, at the edge of the field the efficiency of the lens is reduced to unacceptable levels. For very strong Fresnel lenses, the edge-of-field transmission may be reduced to zero. No combination of facet and return angles can circumvent the efficiency loss of a single Fresnel field lens under such circumstances.

Figure 4:
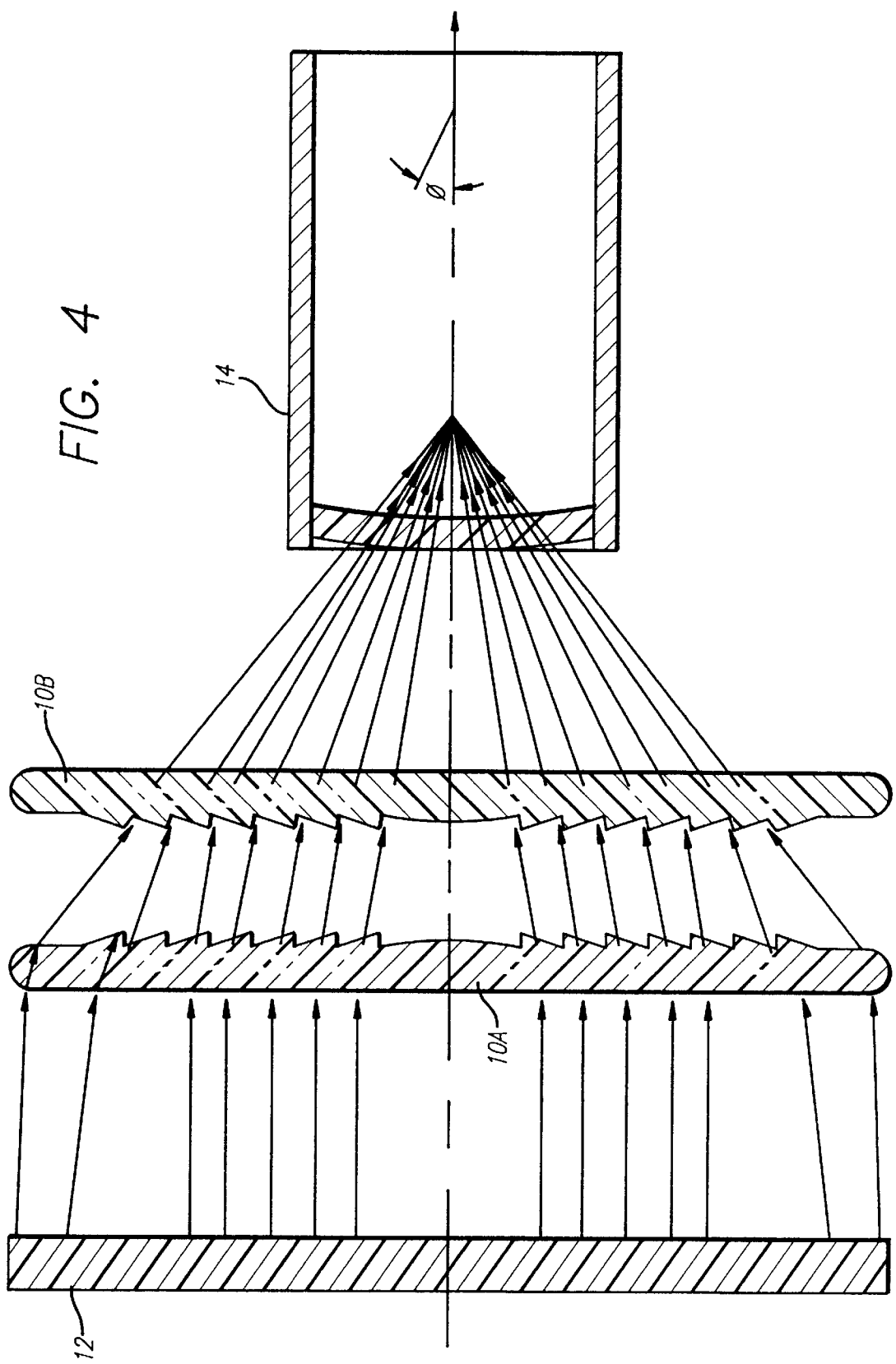
FIG. 4 is a schematic representation of the system of the present invention in one of its embodiments which represents a high efficiency means for coupling paired Fresnel lenses in a dual Fresnel field lens in a single-panel LCD projection system.

In order to overcome the problems discussed above, the projection system of the present invention uses two Fresnel lenses, as shown in FIG. 4, specifically lenses 10A and 10B. The underlying premise of using two Fresnel lenses is that distributing the required optical power over two lower-power lenses allows the product of their individual efficiencies to be higher than that of a single lens with equivalent power. The particular system illustrated in FIG. 4 shows a general solution for the highest-efficiency coupling of the paired Fresnel lenses 10A, 10B.

The two Fresnel lenses 10A and 10B are interposed between the LCD valve 12 and the projection lens assembly 14 of the projection system. The first lens 10A has its planar surface facing the LCD valve 12, and the second Fresnel lens 10B is positioned with its planar surface facing the projection lens assembly of the projection system.

The overall optical power of the lenses 10A and 10B is not necessarily split uniformly between the two lenses. The first Fresnel lens 10A (closest to the LCD valve 12) is defined so that two conditions are met. First, all the light is converging as it exits the lens 10A. Second, the highest angle facets at the extreme edge of the lens 10A is limited to angles which do not create a total internal reflection condition at the lens-to-air boundary.

The second Fresnel lens 10B of the pair is constructed so that its return angles are matched to the local direction of the convergent light after refraction by the facets of the first Fresnel lens 10A. That is, the return angles of the lens 10B are aligned with the center of the local power/angular light distribution. The fact angles of the lens 10B are selected to provide the remaining refractive power necessary to direct the light toward the pupil of the projection lens assembly 14.

The two Fresnel lens system of FIG. 4 permits the highest possible absolute efficiency in the system and the best differential efficiency (uniformity) in a multiple lens system where a single Fresnel lens is inadequate.

The present invention provides, therefore, a simple and inexpensive LCD projection system using two Fresnel field lenses in order to overcome the inadequacies of a LCD projection system using a single Fresnel field lens. The system of the invention achieves the highest possible absolute efficiency and the highest possible differential efficiency.

It will be appreciated that while a particular embodiment of the invention has been shown and described, modifications may be made. It is intended in the following claims to cover all such modifications which fall within the true spirit and scope of the invention.

We claim:

1. A liquid crystal display projection system including:
   a liquid crystal display spatial light modulator and a projection lens assembly displaced along the optical axis from the light modulator, and including first and second flat Fresnel lenses forming field lenses positioned in spaced relationship along the optical axis between the spatial light modulator and the input aperture of the projection lens assembly, each of said flat Fresnel lenses having a faceted face and a planar face and each of the faceted faces containing a plurality of facet surfaces each having a selected inclination to the plane of the corresponding lens with the inclinations of the facet surfaces increasing from the center to the edge of each lens, and each of the faceted faces having a corresponding plurality of return surfaces having selected angles with respect to the plane of the corresponding lens to be parallel to incident light rays, said first Fresnel lens being positioned adjacent to the light modulator with its planar face facing the light modulator and said second Fresnel lens being positioned adjacent to the input aperture of the projection lens assembly with its planar face facing said input aperture.

2. The liquid crystal display projection system defined in claim 1, in which said first Fresnel lens is constructed so that light rays exiting the first Fresnel lens are converging.

3. The liquid crystal display projection system defined in claim 2, in which the facet surfaces at the edge of each Fresnel lens are limited to angles selected to avoid the creation of total internal reflection at the lens-to-air boundary at the edge of each lens.

4. The liquid crystal display projection system defined in claim 3, in which the return surfaces of the second Fresnel lens are positioned to be parallel to convergent light rays from the first Fresnel lens.

5. The liquid crystal display projection system defined in claim 2, in which the angles of the facet surfaces of the second Fresnel lens are selected to provide refraction powers required to direct substantially all light rays incident from the first Fresnel lens to the input aperture of the projection assembly.

* * * * *